United States Patent
Clark

(10) Patent No.: US 10,473,543 B2
(45) Date of Patent: Nov. 12, 2019

(54) SYSTEM FOR SUPPORTING THE CONFIRMATION OF A FLUID CONNECTION

(71) Applicant: Toyota Motor Engineering & Manufacturing North America, Inc., Erlanger, KY (US)

(72) Inventor: Frederick Joseph Clark, Georgetown, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 658 days.

(21) Appl. No.: 14/830,802

(22) Filed: Aug. 20, 2015

(65) Prior Publication Data
US 2017/0052079 A1 Feb. 23, 2017

(51) Int. Cl.
| | |
|---|---|
| *F16L 37/00* | (2006.01) |
| *G01L 5/24* | (2006.01) |
| *F16L 37/14* | (2006.01) |
| *B60K 15/01* | (2006.01) |
| *B60K 15/03* | (2006.01) |
| *B60K 15/035* | (2006.01) |

(52) U.S. Cl.
CPC ............... *G01L 5/24* (2013.01); *B60K 15/01* (2013.01); *F16L 37/144* (2013.01); *B60K 2015/03467* (2013.01); *B60K 2015/03514* (2013.01); *F16L 2201/10* (2013.01)

(58) Field of Classification Search
CPC . G01L 5/24; B60K 15/01; B60K 2015/03514; B60K 2015/03467; F16L 37/144; F16L 37/084; F16L 37/0841; B25B 23/1422; B25B 23/1425

USPC ........... 73/862.191, 862.21, 862.323; 81/479
See application file for complete search history.

(56) References Cited

U.S. PATENT DOCUMENTS

| | | | | |
|---|---|---|---|---|
| 482,714 | A * | 9/1892 | Baeumle | B65D 39/088 217/109 |
| 561,305 | A * | 6/1896 | Barrett | B25B 13/08 81/119 |

(Continued)

FOREIGN PATENT DOCUMENTS

| | | | | |
|---|---|---|---|---|
| DE | 9414340 U1 | * | 1/1996 | ......... B25B 23/1425 |
| DE | 202013102013 U1 | * | 5/2013 | ......... B25B 23/0007 |

(Continued)

OTHER PUBLICATIONS

"Quick-Release Pliers for Push-Lock Fitting Removal", Mill-Rose Clean Fit Products, Undated, (1 page).

*Primary Examiner* — David Bochna
*Assistant Examiner* — James A Linford
(74) *Attorney, Agent, or Firm* — Christopher G. Darrow; Darrow Mustafa PC

(57) ABSTRACT

A method of making and confirming a fluid connection involves making a fluid connection including, at a female piece side, a female piece, and at a male piece side, a male piece axially inserted into the female piece and a shoulder opposing the female piece. By the fitment of a socket portion of an end attachment over the female piece, a bifurcated claw of the socket portion engages between the female piece and the shoulder. Via the bifurcated claw, a disconnection force is applied between the female piece side and the male piece side by pivoting a torque wrench supporting the end attachment.

20 Claims, 4 Drawing Sheets

(56) References Cited

U.S. PATENT DOCUMENTS

| | | | | |
|---|---|---|---|---|
| 922,258 A | * | 5/1909 | Caven | B25B 13/48 |
| | | | | 81/119 |
| 974,107 A | * | 11/1910 | Armstead | F16B 39/32 |
| | | | | 411/331 |
| 4,178,668 A | | 12/1979 | George | |
| 4,416,045 A | | 11/1983 | Staten | |
| 6,595,556 B1 | * | 7/2003 | Zenko | F16L 37/008 |
| | | | | 285/140.1 |
| 7,299,704 B1 | | 11/2007 | Gerdes | |
| 2010/0031486 A1 | | 2/2010 | Catlin | |
| 2011/0239831 A1 | * | 10/2011 | Cole | B25B 13/08 |
| | | | | 81/125 |
| 2017/0089777 A1 | * | 3/2017 | Obata | G01M 5/0058 |

FOREIGN PATENT DOCUMENTS

| | | | | |
|---|---|---|---|---|
| EP | 0240452 A1 | * | 10/1987 | F16L 37/084 |
| EP | 1060844 A2 | * | 12/2000 | B25B 23/0035 |
| FR | 2538741 A1 | * | 7/1984 | B25B 23/1425 |

\* cited by examiner

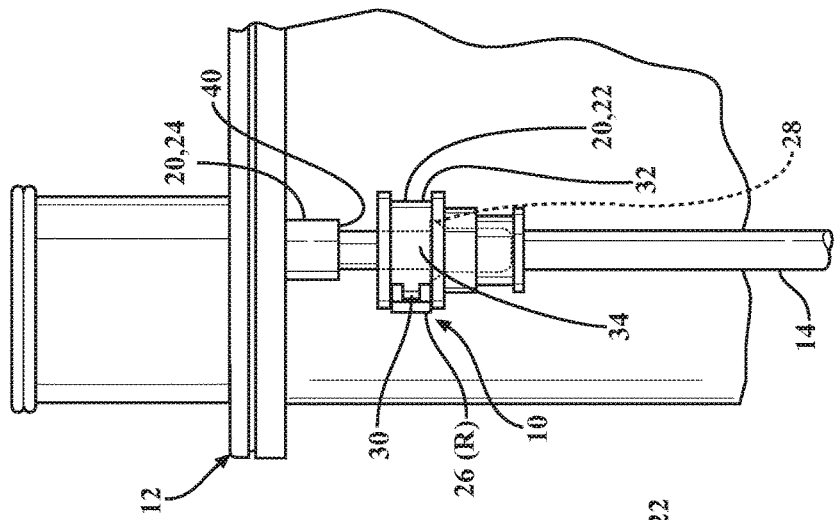
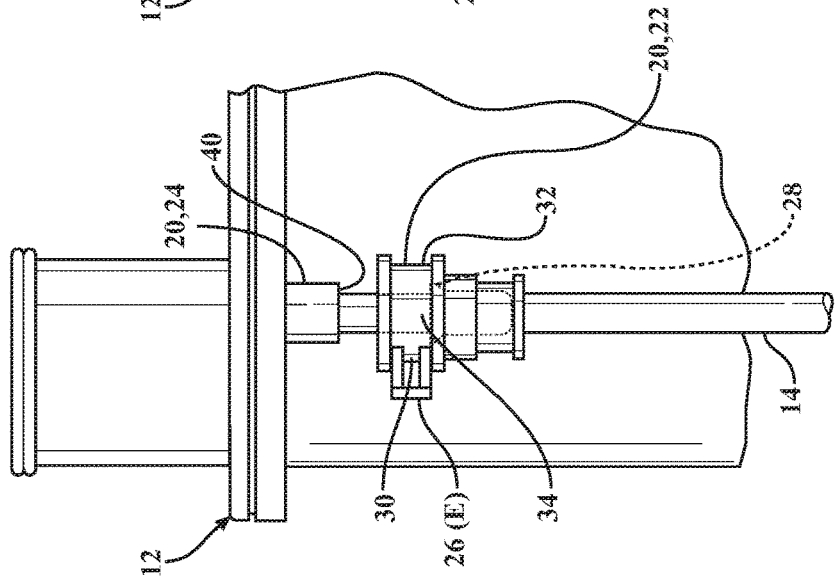
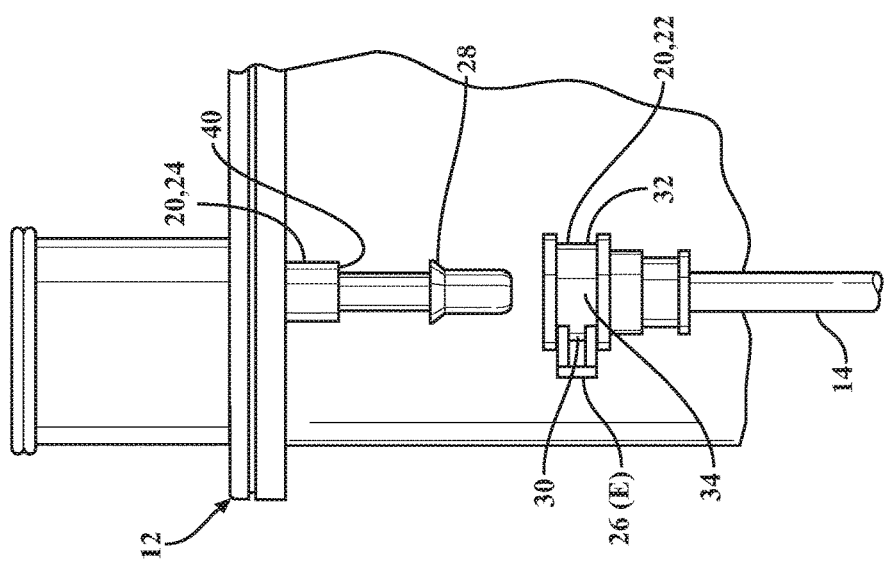

SYSTEM FOR SUPPORTING THE CONFIRMATION OF A FLUID CONNECTION

TECHNICAL FIELD

The embodiments disclosed herein generally relate to fluid connections made with two piece fluid connectors, and to systems for supporting the confirmation of these fluid connections.

BACKGROUND

Vehicles may have a number of fluid connections made with two piece fluid connectors. Often these fluid connectors are quick connectors that include a female piece and a mating male piece.

The assembly of vehicles that include fluid connections made with these fluid connectors may entail an operator confirming the fluid connections. Improving the operator's confirmation of the fluid connections is an ongoing objective that may be accomplished, for example, by improving the equipment used by the operator for this purpose.

SUMMARY

Disclosed herein are embodiments of methods for making and confirming a fluid connection and systems for confirming a fluid connection. In one aspect, a method of making and confirming a fluid connection involves making a fluid connection including, at a female piece side, a female piece, and at a male piece side, a male piece axially inserted into the female piece and a shoulder opposing the female piece. By the fitment of a socket portion of an end attachment over the female piece, a bifurcated claw of the socket portion engages between the female piece and the shoulder. Via the bifurcated claw, a disconnection force is applied between the female piece side and the male piece side by pivoting a torque wrench supporting the end attachment.

In another aspect, a method of making and confirming a fluid connection involves making a fluid connection. The fluid connection includes, at a female piece side, a female piece defining a front circumferential portion, an opposite circumferential portion opposing the front circumferential portion and an adjacent circumferential portion between a side of the front circumferential portion and the opposite circumferential portion, and having a retainer pushable towards the front circumferential portion to a retaining position. The fluid connection further includes, at a male piece side, a male piece axially inserted into the female piece and a shoulder opposing the female piece. By the fitment of a socket portion of an end attachment over the female piece, opposed sidewalls of the socket portion spaced for arrangement respectively along the retainer and the opposite circumferential portion only if the retainer is pushed to its retaining position are arranged respectively along the retainer and the opposite circumferential portion. Further by the fitment of the socket portion over the female piece, a bifurcated claw of the socket portion extending transverse to the opposed sidewalls engages between the female piece and the shoulder. Via the bifurcated claw, a disconnection force is applied between the female piece side and the male piece side by pivoting a torque wrench supporting the end attachment.

In yet another aspect, a system for confirming a fluid connection includes an end attachment including a socket portion configured to fit over a female piece included at a female piece side of a fluid connection. The female piece defines a front circumferential portion, an opposite circumferential portion opposing the front circumferential portion and an adjacent circumferential portion between a side of the front circumferential portion and the opposite circumferential portion, and has a retainer pushable towards the front circumferential portion to a retaining position. The socket portion includes opposed sidewalls spaced for arrangement respectively along the retainer and the opposite circumferential portion only if the retainer is pushed to its retaining position, and a bifurcated claw extending transverse to the opposed sidewalls configured to engage between the female piece and a shoulder included at a male piece side of the fluid connection and opposing the female piece. A torque wrench supports the end attachment, and a torque indicator is responsive to the application of a disconnection torque with the torque wrench corresponding to the application of a disconnection force between the female piece side and the male piece side via the bifurcated claw to generate a disconnection torque application verification signal.

These and other aspects will be described in additional detail below.

BRIEF DESCRIPTION OF THE DRAWINGS

The various features, advantages and other uses of the present embodiments will become more apparent by referring to the following detailed description and drawings in which:

FIGS. 2A-C are side views showing the fluid connection of FIG. 1 being made;

DETAILED DESCRIPTION

This disclosure teaches a system for confirming a fluid connection. The system includes, among other things, a torque wrench and an end attachment supported by the torque wrench. The end attachment includes a socket portion configured to fit over a female piece included at a female piece side of a fluid connection. In examples of the female piece that have a push in retainer, the fitment of the socket portion over the female piece verifies that the retainer is pushed to a retaining position, supporting the confirmation of the fluid connection. Moreover, when the torque wrench is pivoted, the socket portion applies a disconnection force between the female piece side and a male piece side of the fluid connection, further supporting the confirmation of the fluid connection.

Figure 1:
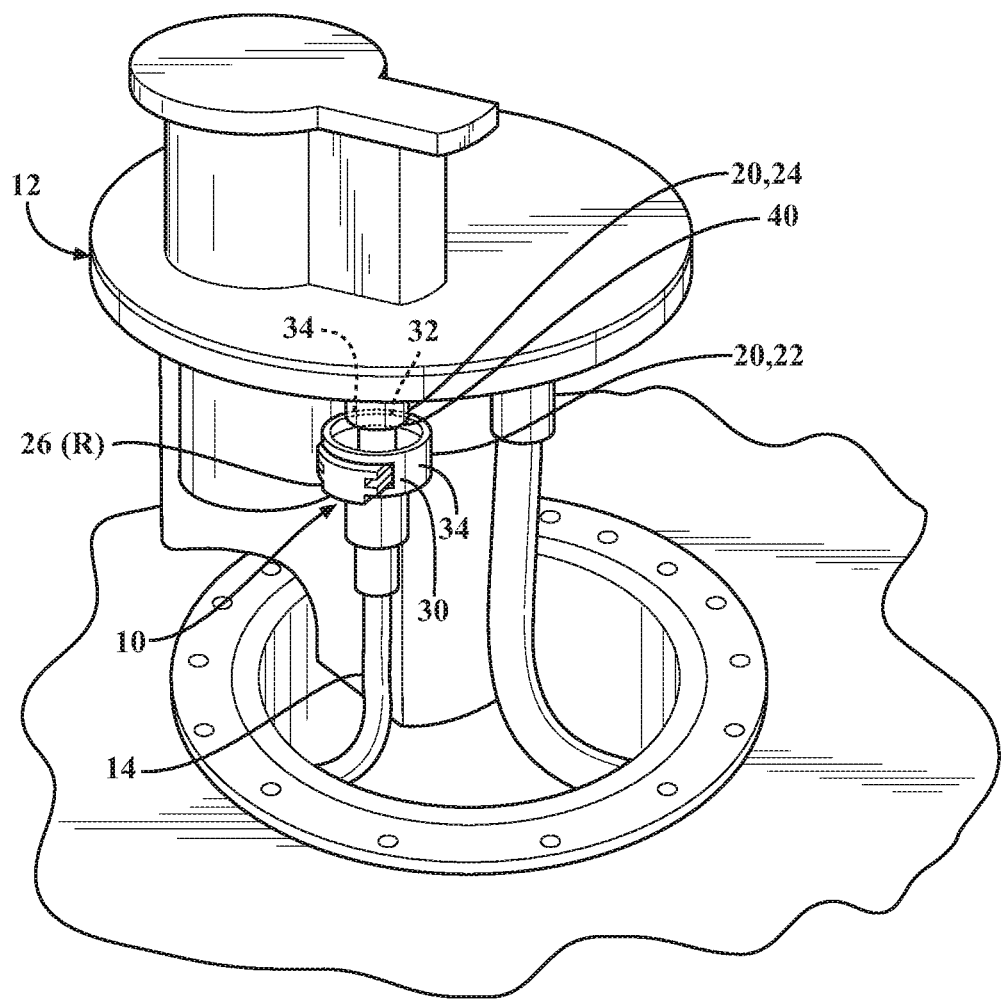
FIG. 1 is a perspective view of a fluid connection including, at a female piece side, a female piece having a push in retainer, and at a male piece side, a male piece axially inserted into the female piece and a shoulder opposing the female piece.

An example of a fluid connection 10 is shown in FIG. 1, The fluid connection 10 may be made, for example, in a fuel system 12 for a vehicle. As shown, for instance, the fluid connection 10 is made between an onboard refueling vapor recovery (ORVR) tube 14 and the remainder of the fuel system 12.

The fluid connection 10 is made with a two piece fluid connector 20. The fluid connector 20 is a so called quick connector including a female piece 22 and a mating male piece 24. As shown, the fluid connection 10 has a female piece side and a male piece side, and includes the female piece 22 having a push in retainer 26 at the female piece side and the male piece 24 having radially extending barb 28 at the male piece side.

The female piece 22 of the fluid connector 20 is generally tubular. In the illustrated example of the female piece 22, the retainer 26 protrudes from a front circumferential portion 30 of the female piece 22 in an extended position E, and is pushable radially towards the front circumferential portion 30 of the female piece 22 to a retaining position R. In its extended position E, the retainer 26 is permissive of the axial insertion of the male piece 24 into the female piece 22, as well as the removal of an axially inserted male piece 24 from the female piece 22. In its retaining position R, the retainer 26 retains an axially inserted male piece 24 in the female piece 22 by engaging its barb 28. According to this example of the female piece 22, at the exterior of the female piece 22, along its circumference, the female piece 22 defines the front circumferential portion 30 from which the retainer 26 protrudes, an opposite circumferential portion 32 opposing the front circumferential portion 30, and two opposed adjacent circumferential portions 34 between respective sides of the front circumferential portion 30 and the opposite circumferential portion 32 opposing the front circumferential portion 30.

As generally shown, the female piece 22 of the fluid connector 20 may be a freestanding component of the fuel system 12. For example, as shown, the female piece 22 fluidly connects the ORVR tube 14 to the axially inserted male piece 24. The female piece 22 may include a hose barb, for instance, for retaining the ORVR tube 14 to the female piece 22. Alternatively, the female piece 22 could, for example, be integrally formed to the ORVR tube 14 or otherwise to the fuel system 12.

The male piece 24 of the fluid connector 20 is, like the female piece 22, generally tubular. The male piece 24 inserts axially into the female piece 22, and is retained in the female piece 22 by the retainer 26 engaging its barb 28, as described above.

As generally shown, the male piece 24 of the fluid connector 20 may be integrally formed to the fuel system 12. Alternatively, the male piece 24 could, for example, be a freestanding component of the fuel system 12. In this alternative example of the male piece 24, the male piece 24 may include a hose barb, for instance, for retaining a tube of the fuel system 12 to the male piece 24.

The fluid connection 10 also includes, at the male piece side, a radially extending shoulder 40 opposing the female piece 22. As shown, the shoulder 40 is formed on the male piece 24. Alternatively, the shoulder 40 could be otherwise formed in the fuel system 12 at the male piece side of the fluid connection 10, for instance, in a tube of the fuel system 12 retained to the male piece 24.

As shown with additional reference to FIGS. 2A-C, the fluid connection 10 is made, in whole or in part, by axially inserting the male piece 24 into the female piece 22 with the retainer 26 of the female piece 22 in its extended position E, and pushing the retainer 26 radially towards the front circumferential portion 30 of the female piece 22 to its retaining position R to retain the axially inserted male piece 24 in the female piece 22.

After the fluid connection 10 is made, it can be confirmed to ensure that the retainer 26 is retaining the axially inserted male piece 24 in the female piece 22. The fluid connection 10 may be confirmed, in whole or in part, by the audible feedback, tactile feedback or visual feedback, or any combination of these, from the female piece 22 as a product of pushing the retainer 26 to its retaining position 1Z. Further, the fluid connection 10 may be confirmed, in whole or in part, by applying a disconnection force in an axial direction between the female piece side and the male piece side of the fluid connection 10. In general, this disconnection force is equal to or greater than the force required to disconnect the fluid connection 10 by removing the axially inserted male piece 24 from the female piece 22 with the retainer 26 of the female piece 22 in its extended position E or with the retainer 26 of the female piece 22 in its retaining position R but not engaging the barb 28 of the male piece 24, but less than a force that would disconnect the fluid connection 10 by removing the axially inserted male piece 24 from the female piece 22 with the retainer 26 of the female piece 22 in its retaining position R and engaging the barb 28 of the male piece 24.

Figure 3:
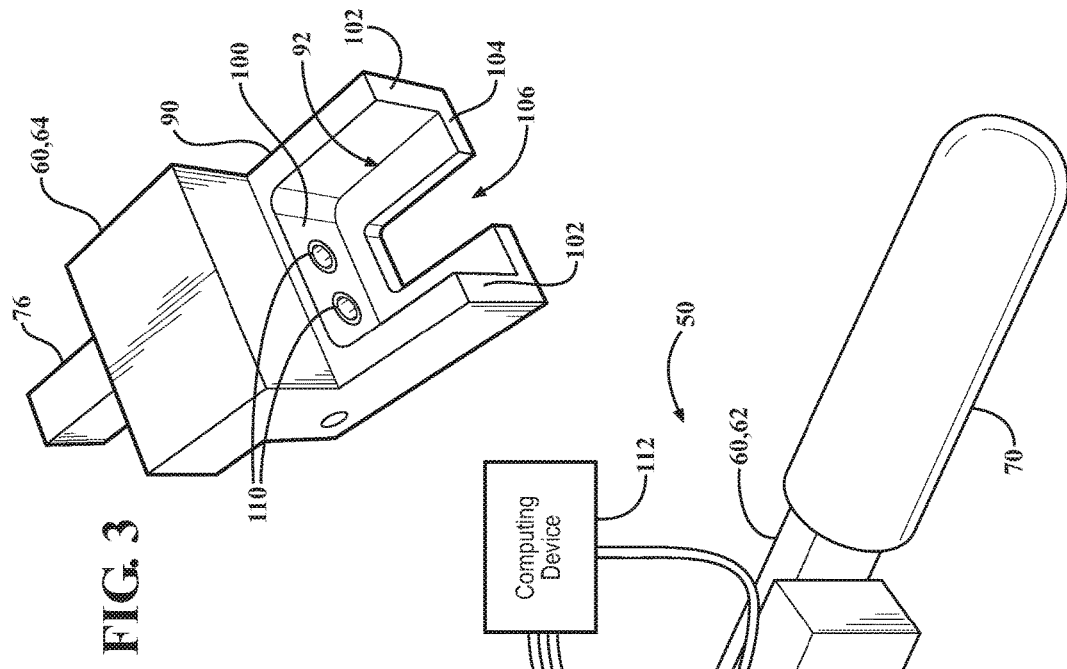
FIGS. 3 and 4 are perspective views of a system for confirming the fluid connection.
Figure 4:
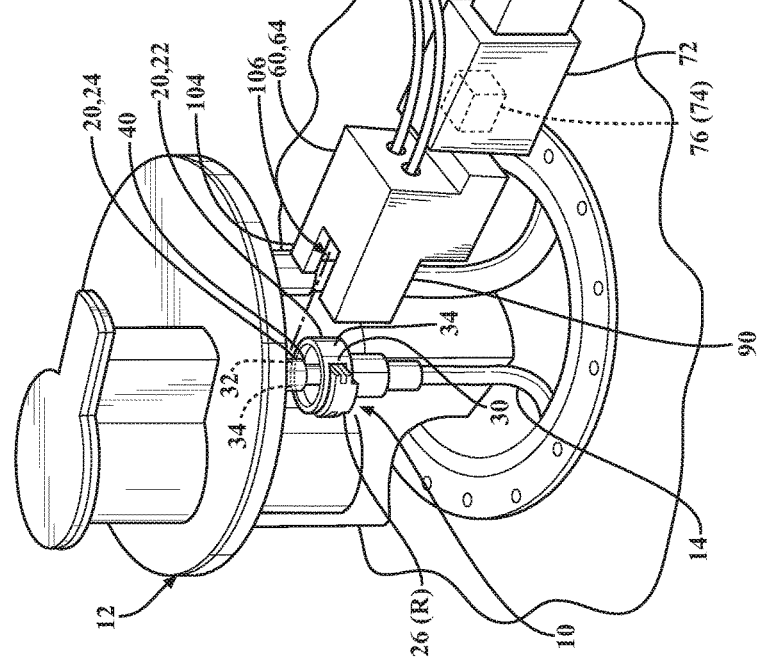

A system 50 for confirming the fluid connection 10 is shown in FIGS. 3 and 4. In general, the system 50 is configured to support the confirmation of the fluid connection 10 by verifying that the retainer 26 is pushed to its retaining position R, and by applying the disconnection force between the female piece side and the male piece side of the fluid connection 10.

The system 50 for confirming the fluid connection 10 includes a confirmation tool 60. The confirmation tool 60 includes a torque wrench 62 and an end attachment 64 for the torque wrench 62. The torque wrench 62 includes a handle 70 and a head 72, and supports the end attachment 64 at its head 72. The torque wrench 62 and the end attachment 64 may include collaborative features for removably connecting the end attachment 64 to the head 72 of the torque wrench 62. For example, as shown, the head 72 of the torque wrench 62 may define a socket 74, the end attachment 64 may include an adaptor 76 configured for connection into the socket 74. Alternatively, the end attachment 64 could be formed integrally with the head 72 of the torque wrench 62, for example.

The confirmation tool 60 further includes a torque indicator 80 coupled between the handle 70 and the head 72 of the torque wrench 62. The torque indicator 80 may be included with the torque wrench 62, as generally shown, or could be otherwise included in the confirmation tool 60. In general, the torque indicator 80 indicates a torque applied between the handle 70 and the head 72. Additionally, for one or more defined torques, the torque indicator 80 may be configured to indicate the application of the defined torque between the handle 70 and the head 72. The torque indicator 80 may, for example, be configured to provide audible feedback, tactile feedback or visual feedback, or any combination of these, as a product of the application of the defined torque.

In addition to the adaptor 76, the end attachment 64 includes a socket portion 90 that is generally configured to fit over the female piece 22 of the fluid connector 20, and in accordance with this general configuration, defines a socket 92 that fits the female piece 22.

As shown, the socket portion 90 includes a base wall 100 adjacent the adaptor 76 and opposed sidewalls 102 extending normally to the base wall 100 away from the adaptor 76. The socket portion 90 further includes a bifurcated claw 104 defining a clearance recess 106 extending normally from the base wall 100 and transversely to the opposed sidewalls 102. The base wall 100, the opposed sidewalls 102 and the bifurcated claw 104 of the socket portion 90 may, as generally shown, be machined, cast, printed or otherwise constructed integrally with one another. Alternatively, one, some or all of the base wall 100, the opposed sidewalk 102 and the bifurcated claw 104 could be separate components connected to the remainder of the socket portion 90.

In the socket portion 90, the socket 92 is defined between the base wall 100, the opposed sidewalls 102 and the bifurcated claw 104, and generally has an opening for accommodating its fitment of the female piece 22 that includes the clearance recess 106 defined by the bifurcated claw 104, and opens, opposite the adaptor 76, from between the opposed sidewalls 102 and the bifurcated claw 104, and closes at the base wall 100.

To fit the socket portion 90 of the end attachment 64 over the female piece 22 of the fluid connector 20, initially, with its opening facing one of the two opposed adjacent circumferential portions 34 of the female piece 22 between respective sides of the front circumferential portion 30 and the opposite circumferential portion 32 opposing the front circumferential portion 30, the socket portion 90 fits radially over the female piece 22, in a direction normal to the direction that the retainer 26 is pushed towards the front circumferential portion 30 to its retaining position R.

Figure 5:
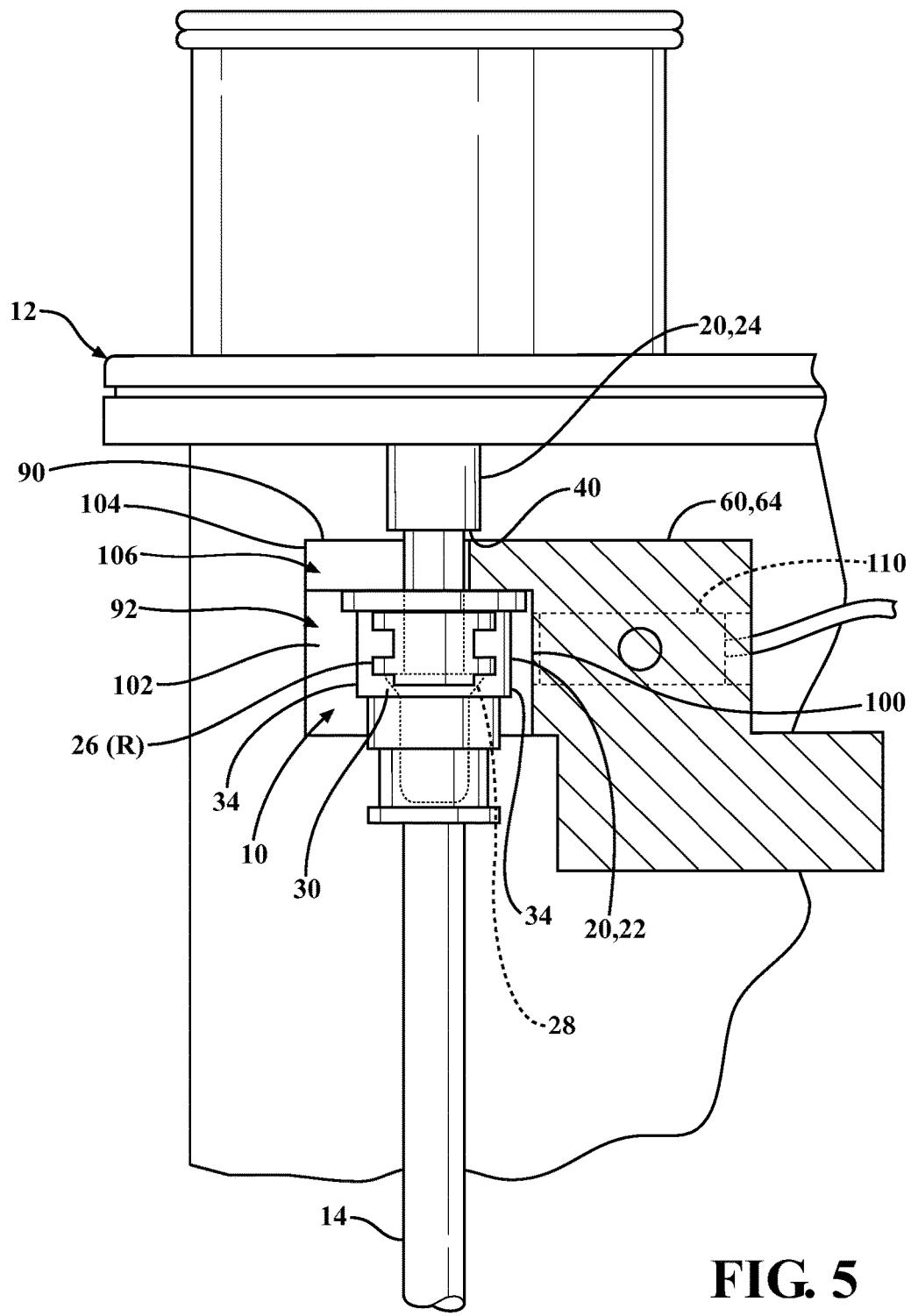
FIG. 5 is a side view of the fluid connection of FIG. 1, showing an aspect of confirming the fluid connection using the system of FIGS. 3 and 4.

As shown with additional reference to FIG. 5, the leading edges of the opposed sidewalls 102 are passed over the retainer 26 and the opposite circumferential portion 32 opposing the front circumferential portion 30, respectively, and the base wall 100 approaches the one adjacent circumferential portion 34, with the clearance recess 106 defined by the bifurcated claw 104 accommodating the male piece 24.

In the end attachment 64, the socket portion 90 is permissive of its fitment over the female piece 22 only if the retainer 26 is pushed to its retaining position R. As generally shown, the opposed sidewalls 102 are spaced, and the spacing between the opposed sidewalls 102 accommodates their passing over the retainer 26 and the opposite circumferential portion 32 opposing the front circumferential portion 30, respectively, only if the retainer 26 is pushed to its retaining position R. If the retainer 26 is protruding from the front circumferential portion 30 in its extended position E or is otherwise not pushed to its retaining position R, the opposed sidewalls 102 will interfere with the retainer 26, and the socket portion 90 will not fit over the female piece 22.

If the fitment of the socket portion 90 over the female piece 22 is permitted, with the socket portion 90 fitted over the female piece 22, the opposed sidewalls 102 are arranged along the retainer 26 and the opposite circumferential portion 32 opposing the front circumferential portion 30, respectively, and the base wall 100 is arranged at the one adjacent circumferential portion 34. Further, with the clearance recess 106 defined by bifurcated claw 104 accommodating the male piece 24, the bifurcated claw 104 straddles the male piece 24, and engages between the female piece 22 and the shoulder 40 that opposes the female piece 22 at the male piece side of the fluid connection 10.

It can be seen that, in use, the confirmation tool 60 can support the confirmation of the fluid connection 10.

As noted above, since the spacing between the sidewalk 102 accommodates their passing over the retainer 26 and the opposite circumferential portion 32 opposing the front circumferential portion 30, respectively, only if the retainer 26 is pushed to its retaining position R, the socket portion 90 is permissive of its fitment over the female piece 22 only if the retainer 26 is pushed to its retaining position R. Therefore, for purposes of supporting the confirmation of the fluid connection 10, the fitment of the socket portion 90 over the female piece 22 indicates that the retainer 26 is pushed to its retaining position R.

The socket portion 90 may be configured to provide audible feedback, tactile feedback or visual feedback, or any combination of these, as a product of the fitment of the socket portion 90 over the female piece 22. Additionally, or alternatively, the socket portion 90 may, as shown, include one or more proximity sensors 110 at the base wall 100 configured to generate a proximity signal as the product of the presence of an object in the socket 92 at the base wall 100. As noted above, with the socket portion 90 fitted over the female piece 22, in addition to the opposed sidewalls 102 being arranged along the retainer 26 and the opposite circumferential portion 32 opposing the front circumferential portion 30, respectively, the base wall 100 is arranged at the one adjacent circumferential portion 34. Therefore, in application in the confirmation tool 60, the proximity signal will be generated as a product of the fitment of the socket portion 90 over the female piece 22 and the resulting presence of the one adjacent circumferential portion 34 in the socket 92 at the base wall 100, and may be used as a retaining position verification signal.

Further, as noted above, with the socket portion 90 fitted over the female piece 22, the bifurcated claw 104 straddles the male piece 24, and engages between the female piece 22 and the shoulder 40 that opposes the female piece 22 at the male piece side of the fluid connection 10. In this arrangement, the bifurcated claw 104 and the remainder of the end attachment 64 may be pivoted via the torque wrench 62 in a radial plane including the direction that the socket portion 90 fits over the female piece 22 in order to apply the disconnection force between the female piece side and the male piece side of the fluid connection 10.

For purposes of supporting the confirmation of the fluid connection 10, the torque indicator 80 coupled between the handle 70 and the head 72 of the torque wrench 62 may be set to indicate the application of a disconnection torque between the handle 70 and the head 72 corresponding to the application of the disconnection force between the female piece side and the male piece side of the fluid connection 10 via the bifurcated claw 104. As noted above, the torque indicator 80 may be configured to provide audible feedback, tactile feedback or visual feedback, or any combination of these, as a product of the application of the disconnection torque between the handle 70 and the head 72. Additionally, or alternatively, the torque indicator 80 may be configured to generate a disconnection torque application verification signal as a product of the application of the disconnection torque between the handle 70 and the head 72 and the resulting application of the disconnection force between the female piece side and the male piece side via the bifurcated claw 104.

In one implementation shown in FIG. 4, the system 50 for confirming the fluid connection 10 may further include a computing device 112 in communication with the one or more proximity sensors 110 and the torque indicator 80 and configured to facilitate, monitor or otherwise manage the confirmation of the fluid connection 10. The computing device 112 may include a processor communicatively coupled with a memory. The processor may include any device capable of executing machine-readable instructions, which may be stored on a non-transitory computer-readable medium, for example memory. The processor may include a controller, an integrated circuit, a microchip, a computer, and/or any other computing device. The memory may include any type of computer readable medium suitable for storing data and algorithms. For example, the memory may include RAM, ROM, a flash memory, a hard drive, and/or any device capable of storing machine-readable instructions.

The computing device 112 may be configured to receive the retaining position verification signal generated by the one or more proximity sensors 110 at the base wall 100 of the socket portion 90 as a product of the fitment of the socket portion 90 over the female piece 22 and the resulting presence of the one adjacent circumferential portion 34 in the socket 92 at the base wall 100, as well as the disconnection torque application verification signal generated by the torque indicator 80 coupled between the handle 70 and the head 72 of the torque wrench 62 as a product of the application of the disconnection torque between the handle 70 and the head 72 and the resulting application of the disconnection force between the female piece side and the male piece side of the fluid connection 10 via the bifurcated claw 104, and to generate a fluid connection confirmation signal in response to receiving the retaining position verification signal, the disconnection torque application verification signal or both.

In one example, the computing device 112 may be configured to generate a fluid connection confirmation signal in response to receiving the retaining position verification signal. In another example, the computing device 112 may be configured to generate a fluid connection confirmation signal in response to receiving the disconnection torque application verification signal. In yet another example, the computing device 112 may be configured to generate a fluid connection confirmation signal in response to receiving both the retaining position verification signal and the disconnection torque application verification signal. In this example, the computing device 112 could be configured, for instance, to generate a fluid connection confirmation signal in response to concurrently receiving both the retaining position verification signal and the disconnection torque application verification signal. As an anti-tie down measure, following the generation of one fluid connection confirmation signal confirming a particular fluid connection 10, the computing device 112 could be configured, for instance, to require removal of the retaining position verification signal and the disconnection torque application verification signal before proceeding to a confirmation cycle for another fluid connection 10.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of making and confirming a fluid connection, comprising:
   making a fluid connection, the fluid connection including,
      at a female piece side, a female piece, the female piece defining a front circumferential portion, an opposite circumferential portion opposing the front circumferential portion and an adjacent circumferential portion between a side of the front circumferential portion and the opposite circumferential portion, and having a retainer pushable towards the front circumferential portion to a retaining position, and at a male piece side, a male piece axially inserted into the female piece and a shoulder opposing the female piece;
   by the fitment of a socket portion of an end attachment that includes opposed sidewalls spaced for arrangement respectively along the retainer and the opposite circumferential portion when the retainer is pushed to its retaining position, and a bifurcated claw extending inside and transverse to the opposed side walls, radially over the female piece in a direction normal to a direction that the retainer is pushed to its retaining position, arranging the opposed sidewalls respectively along the retainer and the opposite circumferential portion, and with the bifurcated claw straddling the male piece, engaging the bifurcated claw between the female piece and the shoulder; and
   applying, via the bifurcated claw, a disconnection force between the female piece side and the male piece side by pivoting a torque wrench supporting the end attachment.

2. The method of claim 1, further comprising:
   generating, with a torque indicator, a disconnection torque application verification signal in response to the application of a disconnection torque with the torque wrench corresponding to the application of the disconnection force between the female piece side and the male piece side via the bifurcated claw.

3. The method of claim 2, further comprising:
   receiving, at a computing device, the disconnection torque application verification signal; and
   in response to receiving the disconnection torque application verification signal, generating, with the computing device, a fluid connection confirmation signal.

4. The method of claim 1, further comprising:
   by the fitment of the socket portion radially over the female piece, arranging a base wall of the socket portion extending normally to the opposed sidewalls and the bifurcated claw at the adjacent circumferential portion.

5. The method of claim 4, further comprising:
   generating, with a proximity sensor at the base wall, a retaining position verification signal in response to the presence of the adjacent circumferential portion at the base wall.

6. The method of claim 5, further comprising:
   receiving, at a computing device, the retaining position verification signal; and
   in response to receiving the retaining position verification signal, generating, with the computing device, a fluid connection confirmation signal.

7. The method of claim 1, further comprising:
   by the fitment of the socket portion radially over the female piece, arranging a base wall of the socket portion extending normally to the opposed sidewalls and the bifurcated claw at the adjacent circumferential portion;
   generating, with a torque indicator, a disconnection torque application verification signal in response to the application of a disconnection torque with the torque wrench corresponding to the application of the disconnection force between the female piece side and the male piece side via the bifurcated claw;
   generating, with a proximity sensor at the base wall, a retaining position verification signal in response to the presence of the adjacent circumferential portion at the base wall;
   receiving, at a computing device, the retaining position verification signal and the disconnection torque application verification signal; and
   when the retaining position verification signal and the disconnection torque application verification signal are received concurrently, generating, with the computing device, a fluid connection confirmation signal.

8. A system for confirming a fluid connection, comprising:
an end attachment including a socket portion configured to fit over a female piece included at a female piece side of a fluid connection, the female piece defining a front circumferential portion, an opposite circumferential portion opposing the front circumferential portion and an adjacent circumferential portion between a side of the front circumferential portion and the opposite circumferential portion, and having a retainer pushable towards the front circumferential portion to a retaining position, the socket portion including opposed sidewalls spaced for arrangement respectively along the retainer and the opposite circumferential portion when the retainer is pushed to its retaining position, and a bifurcated claw extending inside and transverse to the opposed side walls, wherein when the retainer is pushed to its retaining position, the socket portion is configured to fit radially over the female piece in a direction normal to a direction that the retainer is pushed to its retaining position, whereby the opposed sidewalls are arranged respectively along the retainer and the opposite circumferential portion, and the bifurcated claw straddles a male piece included at a male piece side of the fluid connection and axially inserted into the female piece, and engages between the female piece and a shoulder included at the male piece side of the fluid connection and opposing the female piece;
a torque wrench supporting the end attachment; and
a torque indicator responsive to the application of a disconnection torque with the torque wrench corresponding to the application of a disconnection force between the female piece side and the male piece side via the bifurcated claw to generate a disconnection torque application verification signal.

9. The system of claim 8, further comprising:
a computing device configured to:
receive the disconnection torque application verification signal; and
in response to receiving the disconnection torque application verification signal, generate a fluid connection confirmation signal.

10. The system of claim 8, further comprising:
in the socket portion, a base wall configured for arrangement at the adjacent circumferential portion, wherein the opposed sidewalls and the bifurcated claw extend normally to the base wall.

11. The system of claim 10, further comprising:
a proximity sensor at the base wall responsive to the presence of the adjacent circumferential portion at the base wall to generate a retaining position verification signal.

12. The system of claim 11, further comprising:
a computing device configured to:
receive the retaining position verification signal; and
in response to receiving the retaining position verification signal, generate a fluid connection confirmation signal.

13. The system of claim 8, further comprising:
in the socket portion, a base wall configured for arrangement at the adjacent circumferential portion, wherein the opposed sidewalls and the bifurcated claw extend normally to the base wall;
a proximity sensor at the base wall responsive to the presence of the adjacent circumferential portion at the base wall to generate a retaining position verification signal; and
a computing device configured to:
receive the retaining position verification signal and the disconnection torque application verification signal; and
when the retaining position verification signal and the disconnection torque application verification signal are received concurrently, generate a fluid connection confirmation signal.

14. The system of claim 8, wherein the end attachment further includes an adaptor for connecting the end attachment to the torque wrench, and the end attachment is connected, via the adaptor, to the torque wrench.

15. The system of claim 14, wherein the torque wrench includes a head defining a socket into which the adaptor is removably connected.

16. A system for confirming a fluid connection, comprising:
an end attachment including a socket portion configured to fit over a female piece included at a female piece side of a fluid connection, the female piece defining a front circumferential portion, an opposite circumferential portion opposing the front circumferential portion and an adjacent circumferential portion between a side of the front circumferential portion and the opposite circumferential portion, and having a retainer pushable towards the front circumferential portion to a retaining position, the socket portion including an adaptor, a base wall adjacent the adaptor, opposed sidewalls extending normally from the base wall away from the adaptor and spaced for arrangement respectively along the retainer and the opposite circumferential portion when the retainer is pushed to its retaining position, and a bifurcated claw extending inside and transverse to the opposed side walls, wherein when the retainer is pushed to its retaining position, the socket portion is configured to fit radially over the female piece in a direction normal to a direction that the retainer is pushed to its retaining position, whereby the base wall is arranged at the adjacent circumferential portion, the opposed sidewalls are arranged respectively along the retainer and the opposite circumferential portion, and the bifurcated claw straddles a male piece included at a male piece side of the fluid connection and axially inserted into the female piece, and engages between the female piece and a shoulder included at the male piece side of the fluid connection and opposing the female piece.

17. The system of claim 16, further comprising:
a torque wrench to which the end attachment is connected via the adaptor; and
a torque indicator responsive to the application of a disconnection torque with the torque wrench corresponding to the application of a disconnection force between the female piece side and the male piece side via the bifurcated claw to generate a disconnection torque application verification signal.

18. The system of claim 17, wherein the torque wrench includes a head defining a socket into which the adaptor is removably connected.

19. The system of claim 16, further comprising:
a proximity sensor at the base wall responsive to the presence of the adjacent circumferential portion at the base wall to generate a retaining position verification signal.

20. The system of claim 16, further comprising:
a torque wrench to which the end attachment is connected via the adaptor;

a torque indicator responsive to the application of a disconnection torque with the torque wrench corresponding to the application of a disconnection force between the female piece side and the male piece side via the bifurcated claw to generate a disconnection torque application verification signal;

a proximity sensor at the base wall responsive to the presence of the adjacent circumferential portion at the base wall to generate a retaining position verification signal; and a computing device configured to:
  receive the retaining position verification signal and the disconnection torque application verification signal; and
  when the retaining position verification signal and the disconnection torque application verification signal are received concurrently, generate a fluid connection confirmation signal.

* * * * *

UNITED STATES PATENT AND TRADEMARK OFFICE
CERTIFICATE OF CORRECTION

PATENT NO. : 10,473,543 B2
APPLICATION NO. : 14/830802
DATED : November 12, 2019
INVENTOR(S) : Clark It is certified that error appears in the above-identified patent and that said Letters Patent is hereby corrected as shown below:

In the Specification

Column 2, Line 59: replace "FIG. 1," with --FIG. 1.--
Column 4, Line 2: replace "retaining position 1Z" with --retaining position R--
Column 5, Line 1: replace "sidewalk 102" with --sidewalls 102--
Column 5, Line 50: replace "defined by bifurcated claw 104" with --defined by the bifurcated claw 104--
Column 5, Lines 57-58: replace "sidewalk 102" with --sidewalls 102--

Signed and Sealed this
Twenty-fifth Day of February, 2020

Andrei Iancu
*Director of the United States Patent and Trademark Office*